United States Patent [19]

McKenna et al.

[11] Patent Number: 5,187,928
[45] Date of Patent: Feb. 23, 1993

[54] HARVESTING APPARATUS AND METHOD

[75] Inventors: Frank J. McKenna, Shaker Heights; Richard K. Horst; James F. Horst, both of Orrville, all of Ohio; Charles S. Wright, Leesburg; John D. Matthews, Melbourne, both of Fla.

[73] Assignee: Kathleen McKenna, Shaker Hts., Ohio

[21] Appl. No.: 906,060

[22] Filed: Jun. 29, 1992

Related U.S. Application Data

[63] Continuation of Ser. No. 572,153, Aug. 23, 1990, Pat. No. 5,125,223.

[51] Int. Cl.$^5$ .............................. A01D 46/24
[52] U.S. Cl. .................... 56/328.1; 56/329; 56/480; 56/DIG. 8; 56/DIG. 9
[58] Field of Search .......... 56/328.1, 327.1, 329, 56/480, 473.5, DIG. 5, DIG. 2, DIG. 8, DIG. 9, 12.8

[56] References Cited

U.S. PATENT DOCUMENTS

| | | | |
|---|---|---|---|
| 3,731,569 | 5/1973 | Quanrud | 241/101.7 X |
| 4,064,683 | 12/1977 | Tennes et al. | 56/340.1 |
| 4,320,995 | 3/1982 | Tennes et al. | 56/328.1 X |
| 4,558,561 | 12/1985 | Mendenhall | 56/327.1 X |

Primary Examiner—Terry Lee Melius
Attorney, Agent, or Firm—Calfee, Halter & Griswold

[57] ABSTRACT

A harvesting apparatus and method includes a vehicle designed for operation along aisles between rows of low density young citrus trees for collecting, storing and transporting citrus fruit harvested by multiple workers moving along in front of the vehicle. The apparatus and method is more efficient and cost effective for harvesting citrus fruit from low density young citrus trees and eliminates pallet tubs and the vehicle boom required to empty and replace the tubs as used in the "conventional harvesting method". The machine and method includes a large semi-circular tray preferably mounted at a level about two feet above the ground on the front of a self-propelled vehicle carrying a hopper. The tray is selectively removable to allow a tray of different size to be mounted on the vehicle to meet the harvesting conditions involved at given citrus groves. The bottom wall of the tray is sloped downwardly to gravity feed the picked fruit to the front end of the duct system, which pneumatically conveys the picked fruit to the hopper. Subatmospheric pressure is maintained within the hopper to generate air flow from the front end of the duct system into the hopper. The hopper is pivotally mounted on the rear portion of the vehicle for selective dumping of the picked fruit. The hopper may selectively be elevated before dumping to allow the harvesting vehicle to be used with different types of fruit transporting trailers and vehicles.

9 Claims, 7 Drawing Sheets

HARVESTING APPARATUS AND METHOD

This application is a continuation of U.S. patent application No. 07/572,153 which was filed on Aug. 23, 1990, now U.S. Pat. No. 5,125,223, and which is entitled "Harvesting Apparatus and Method." The entire disclosure of this application is hereby incorporated by reference.

FIELD OF THE INVENTION

The invention relates to a self-propelled mechanical harvesting apparatus and method to enable multiple workers to more efficiently pick and collect citrus fruits from young citrus trees.

BACKGROUND OF THE INVENTION

Citrus fruits are harvested by hand picking. In general, the conventional harvesting method for picking citrus fruit from low density trees uses pallet tubs, pick sacks and expensive in-grove vehicles with booms for collecting and removing the picked fruit from the grove.

More specifically, the picked fruit is placed into a sack carried over the shoulder of the fruit picker. The citrus fruit picker carries the full sack of fruit to a pallet tub having, for example, a ten box capacity. The fruit picker empties about sixty (60) pounds of picked fruit from the sack into the pallet tub and then returns to the next tree with an empty sack to repeat the cycle.

The pallet tub is a means of collecting picked fruit in citrus groves. A large number of pallet tubs are placed in spaced relationship to one another throughout the grove in rows adjacent the trees to reduce the walking distances involved to empty a fruit filled sack. A full pallet tub weighs about 900 lbs. and is emptied by means of a field truck with a boom. The field truck is called a loader or goat.

The current method for harvesting, collecting and removing fruit from citrus groves containing smaller or younger trees requires pick sacks, pallet tubs and a loader to lift and empty the full pallet tubs and to then reposition the empty pallet tubs. The process of collecting and removing the picked fruit from the grove with the loader is called "road-siding". The loader is a modified truck equipped with a rotatably mounted hydraulic boom specifically designed to lift and empty a fruit filled pallet tub into the loader's bed. Alternatively, the loader may be modified to straddle the pallet tubs and either lift or place those tubs through a specialized fork lift type mechanism, as shown for example in U.S. Pat. No. 3,666,126. The loader's bed is supported by a hydraulic scissor lift which raises and pivots the bed to empty the load of fruit into a trailer. The trailer hauls the fruit to the processing plant.

The distance between the respective pallet tubs in rows adjacent the citrus trees is determined by the amount of citrus fruit on the trees to be picked between the pallet tubs. Citrus groves with high fruit density trees, about 1,100 oranges per tree, require the tubs to be relatively closely spaced to one another. This close spacing increases the efficiency and productivity of a picker by reducing the walking distance from the tree to the pallet tub. Conversely, young citrus groves with low fruit density, about 8 to 12 oranges per tree, result in the tubs being spaced further apart. The increased spacing requires the picker to walk with a partially full sack of fruit greater distances between pallet tubs. The cost of operating the loaders does not permit the driver to work along with small groups of pickers for picking low density trees. The equipment would either be idle or would inefficiently be continuously moving partially filled pallet tubs as the pickers move from tree to tree.

A ten box pallet tub holds about 2,200 oranges which represents the average production from two trees that are eight to ten years old. Citrus groves with young trees that are two to four years old will average about eight to twelve oranges a tree per year. A citrus grove with young trees with an average fruit density of ten oranges a tree requires a picker to harvest about two hundred and twenty trees to fill one pallet tub. Citrus trees are spaced about 16 feet apart requiring a picker to walk about 3,520 feet to fill one pallet tub. Citrus growers are charged two to three times the normal picking rate to have their low density, young trees picked. As a result, most growers cannot afford to justify the additional cost to have the fruit picked from their young trees until the trees reach a minimum production of about 30 oranges per tree.

A series of freezes during the past eight years substantially reduced the number of high density groves and precipitated a sharp increase in the number of newly planted citrus groves. Changes in the Immigration Act and the substantial reduction in the number of high density citrus groves has made it extremely difficult and expensive to harvest citrus fruit from low density young citrus trees.

These freezes have caused the citrus industry to reconsider the planting configuration utilized for new trees. Several groves have been planted where the trees are planted more closely together in the rows and where the aisles between rows are narrower. For example, groves have been planted with trees spaced eight feet apart with fifteen foot wide aisles. This increased density is believed to provide some protection against frost conditions and reduces the walking distances required for picking these young trees having a low fruit density. However, this increased tree planting density also creates picking problems because it is difficult to move and position the bins and difficult to maneuver and use the loader.

Some other machines to mechanize the harvesting of citrus fruit have been developed. However, these machines are best utilized on taller trees having a high fruit density.

For example, U.S. Pat. No. 3,878,957 discloses a fruit harvesting apparatus with a rotatably mounted extensible hollow boom on the front section of a vehicle. A man supporting bucket is carried at the outer end of the boom. The trough around the bucket guides the fruit picked by a man therein into the outer or distal end of the boom. Three telescopically connected extensible ducts within the boom extend from the trough to a hopper. Subatmospheric pressure is used in the extensible ducts to pneumatically convey the fruit through the extensible boom to the hopper for bulk storage.

The fruit harvesting apparatus disclosed in U.S. Pat. No. 3,878,957, which is exclusively licensed to the assignee of the present invention, will not allow multiple persons simultaneously to use the bucket to harvest citrus fruit. As the man supporting bucket of this patent moves closer to the ground, the radius of the flex duct connecting the trough to the outer opening of the duct at the distal end of the boom becomes increasingly smaller. When the bucket sits on the ground, the small radius of the flex duct restricts the opening for the fruit and limits the number of oranges that can flow into the pneumatic duct system. As a result, the production from multiple persons harvesting fruit and placing that fruit in the trough of the bucket at ground level will clog the flex duct entry thereby preventing the efficient use of the boom machine for picking small young trees. In addition, the use of the extensible boom is relatively complicated, and the boom machine is more expensive to build and maintain than the present apparatus.

This problem with the capacity and use of the boom machine was at least partially addressed by providing several additional flexible pneumatic hoses extending from the hopper. Pickers could walk beside the loader and place picked citrus fruit into the additional hoses. However, these hoses were awkward to use, were heavy to handle, and usually become clogged with citrus fruit.

Other examples of boom type harvesting machines are described and illustrated in U.S. Pat. Nos. 2,450,152; 2,821,312; 2,973,112; 3,329,290; 3,523,404 and 3,633,336.

SUMMARY OF THE INVENTION

The present invention includes a fruit harvesting apparatus and method for harvesting young citrus trees with very low fruit density. The large tray attached to the front of the self-propelled vehicle has its bottom wall sloped downwardly toward the machine. The picked fruit when placed in the tray is gravity fed to the front end of the duct system. The fruit is pneumatically conveyed through the duct system to the hopper on the vehicle.

One advantage of the invention is that four to ten workers can walk alongside the machine, two to five on either side, simultaneously picking and continuously placing the picked fruit in the tray as the machine is driven down the row of trees being picked. The production from a picker is increased because the invention reduces the distances walked and thus affords the picker more time and energy to pick fruit. The person driving the vehicle can also supervise the pickers and in part control the speed of the picking process by controlling the speed of the vehicle.

Initial experimental field tests indicate that the vehicle with front tray and the method o using the same will enable six pickers and one person driving the machine to harvest about 115,000 oranges a day from young trees. The current method of using pallet tubs and a loader requires about 15 to 18 pickers and one driver to pick the same volume of oranges from young trees in a day.

The invention eliminates the use of pallet tubs and specialized boom type loaders to handle the tubs and the problems resulting from their use. These loaders are relatively difficult to operate, are difficult to maneuver, are labor intensive, and are more expensive to acquire and operate than the harvesting vehicle of the present invention. By eliminating these tubs and boom loaders, a more efficient and cost effective method has been developed.

In addition, the width and size of the vehicle and tray can be custom designed to work within the various planting configurations employed in different groves. The tray is removably mounted on the vehicle to allow a tray of different size to be mounted thereon. The tray is selected to have dimensions compatible with the configuration of the grove being picked. For example, in a grove having narrow aisles, a tray of reduced width would be selected and mounted on the vehicle.

The harvesting vehicle also may have a vertically movable hopper. By selectively elevating the hopper before dumping, the harvesting vehicle can be universally used with fruit conveyance trailers of varying bed sizes.

These and other objects and advantages of the present invention will become apparent as the following description proceeds.

DETAILED DESCRIPTION OF THE PREFERRED EMBODIMENT

Figure 1:
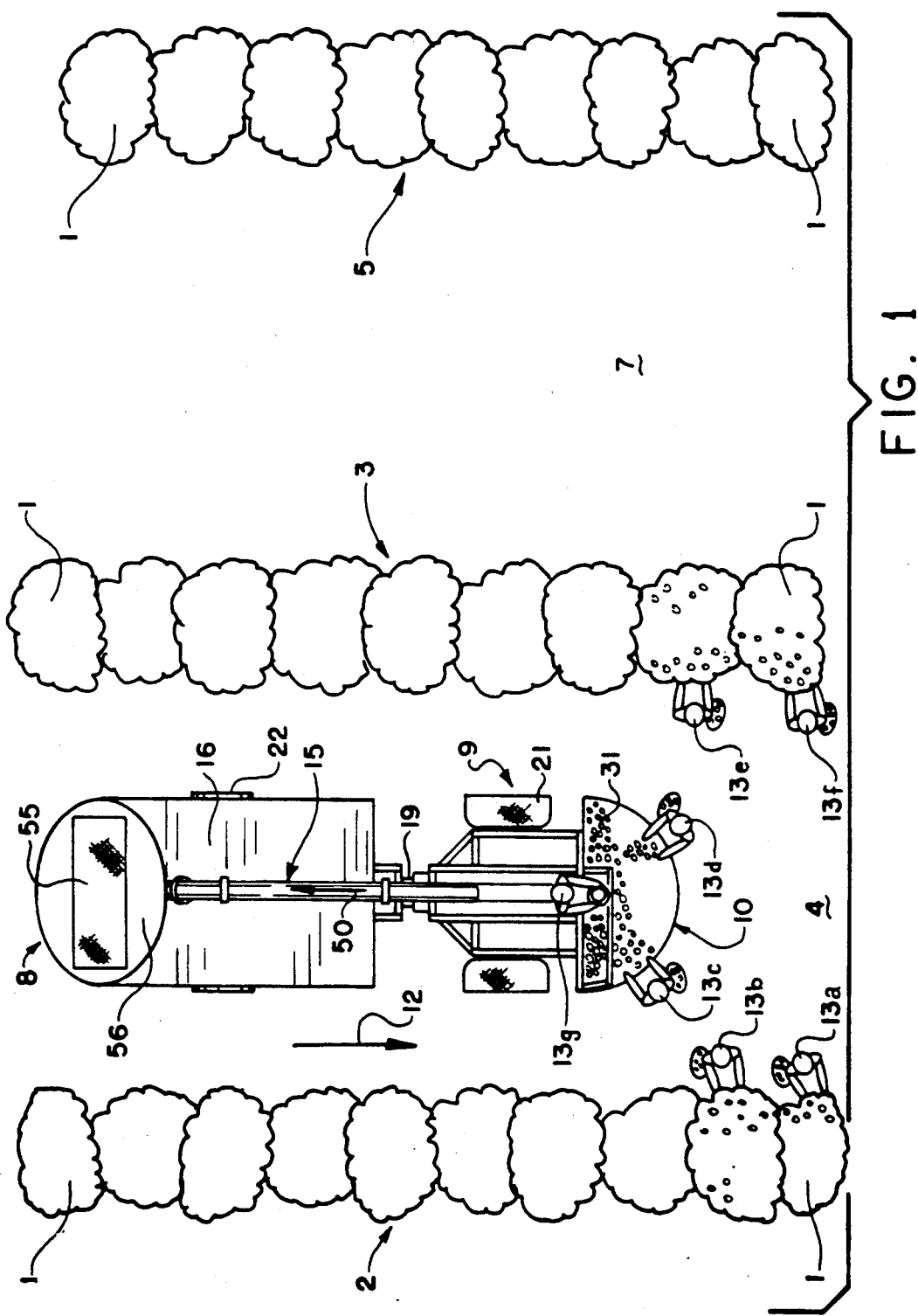
FIG. 1 schematic plan view showing the fruit harvesting apparatus of the present invention in operation with a picking crew moving along an aisle between rows of citrus tress.

Turning now in more detail to the drawings and initially to FIG. 1, a plurality of young citrus trees 1 have been planted in close proximity to one another in a first row of citrus trees, identified generally by the reference numeral 2. A second row of young citrus trees, identified generally by the reference numeral 3, has been planted substantially parallel to the first row 2. Parallel rows 2 and 3 of citrus trees 1 define therebetween an aisle 4. Similarly, a third row of relatively young citrus trees, identified generally by the reference numeral 5, is planted in generally parallel relationship to the second row of citrus trees 3. The citrus trees in rows 3 and 5 define therebetween a second aisle 7. A number of these generally parallel rows of citrus trees defining aisles therebetween are planted on large plots of land to form a citrus tree grove.

As a result of several freezes over the past decade, many new citrus trees have been planted to replace trees lost in the freezes. The trend is to plant these new trees closer to one another in rows having narrower aisles therebetween. The present invention is directed to a fruit harvesting apparatus, indicated generally at 8, and a method for operating the same to economically pick fruit from low density young citrus trees planted in this more densely packed grove configuration.

The fruit harvesting apparatus 8 includes a self-propelled vehicle, indicated generally at 9, equipped with either two or four wheel drive, as required, for movement in either a forward or reverse direction. The vehicle 9 has a semi-circular tray, indicated generally at 10, mounted to the front end thereof. Picked citrus fruit is placed in the tray 10 by multiple persons, who have picked that fruit from the citrus trees in front of and immediately adjacent to the vehicle 9.

The citrus fruit picking crew normally consists of four to ten persons moving along in front of or to the side of the vehicle 9. The vehicle is being driven along the aisle 4 in the direction of arrow 12. The size of the crew is dependent, among other things, upon fruit density, tree spacing and manpower availability.

As shown, six persons, respectively identified as 13A-13F in FIG. 1, are being utilized for picking, with a seventh person, identified as 13G, driving the vehicle 9. Pickers 13A and 13B are removing citrus fruit from trees 1 in row 2 and placing that fruit into sacks (or other containers) carried on their respective shoulders. Pickers 13E and 13F are shown as picking fruit from citrus trees 1 in row 3 and placing the picked fruit in sacks carried over their respective shoulders. Pickers 13C and 13D are placing the picked fruit from their full shoulder sacks into tray 10. The driver 13G acts as a supervisor for the crew of pickers 13A through 13F.

These pickers are usually immediately in front of and adjacent to the vehicle 9 and may be readily observed by and in oral communication with supervisor 13G. By substantially continuously moving vehicle 9 in the direction of arrow 12, the supervisor 13G is able to establish a comfortable picking speed for the pickers 13A-13F to control the speed of the fruit harvesting operation. The substantially continuous movement of the vehicle 9 also minimizes the distance between the respective pickers 13A through 13F and the tray 10 to reduce the distance that the pickers must walk to deposit the citrus fruit from their filled sacks into the tray 10.

This tray 10 is mounted on the vehicle 9 adjacent the ground at a convenient height for the pickers to place the fruit into the tray. A tray height from the ground of from 2 to 2½ feet would be preferred for this purpose.

The picked fruit deposited in tray 10 is pneumatically conveyed from the tray 10 through a duct transfer system, indicated generally at 15, to a generally cylindrical hopper 16 pivotally mounted on the back portion of vehicle 9. The hopper 16 has a capacity to hold approximately 90 boxes of oranges. When the hopper 16 becomes substantially full, the picked citrus fruit temporarily stored in hopper 16 is dumped into a trailer for delivery to a collection sight. The details of the vehicle 9, tray 10, duct transfer system 15 and hopper 16 are best illustrated and described in the context of FIGS. 2 and 3.

Figure 2:
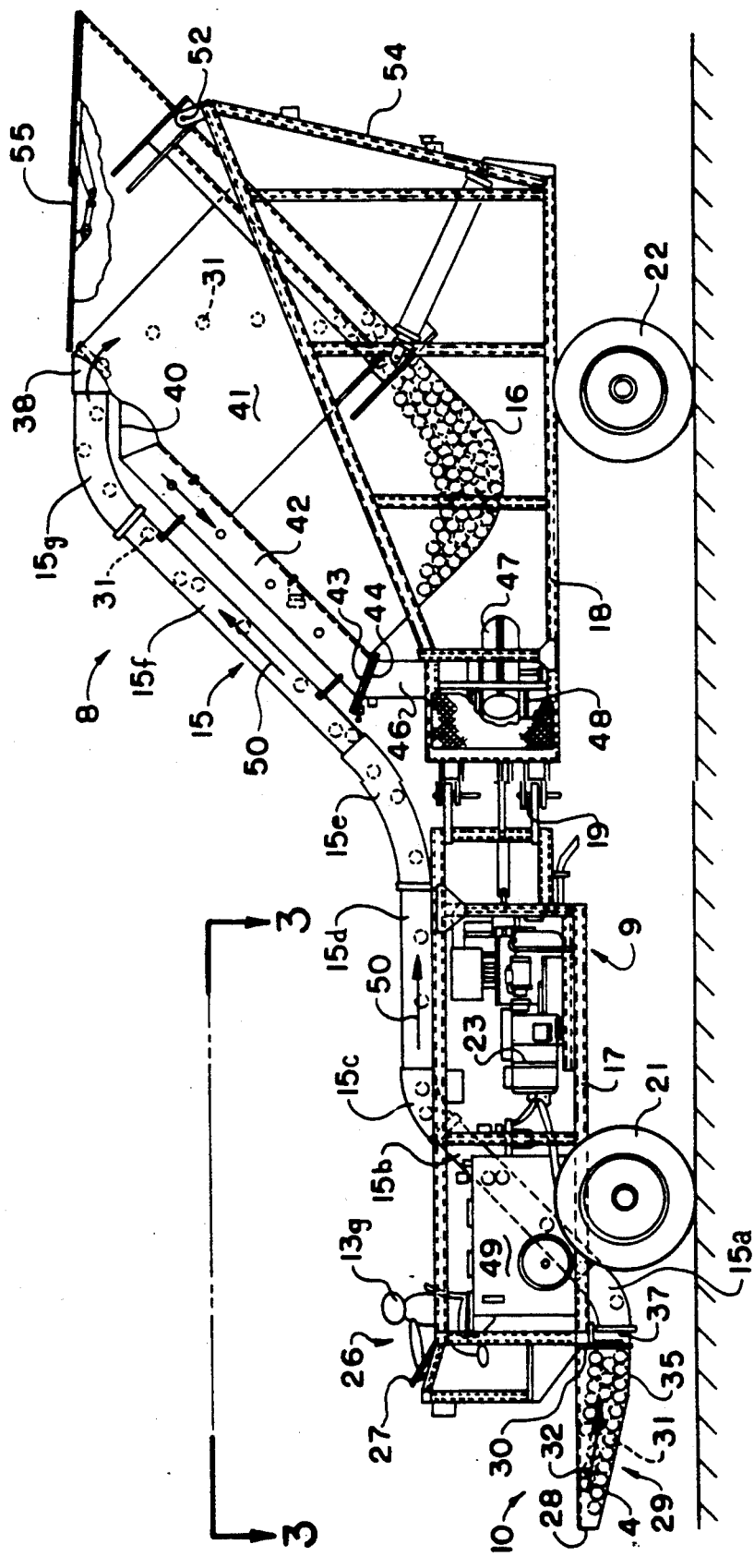
FIG. 2 is a side elevation of the fruit harvesting apparatus illustrating fruit being conveyed from the front tray through the transfer duct system to the hopper.
Figure 3:
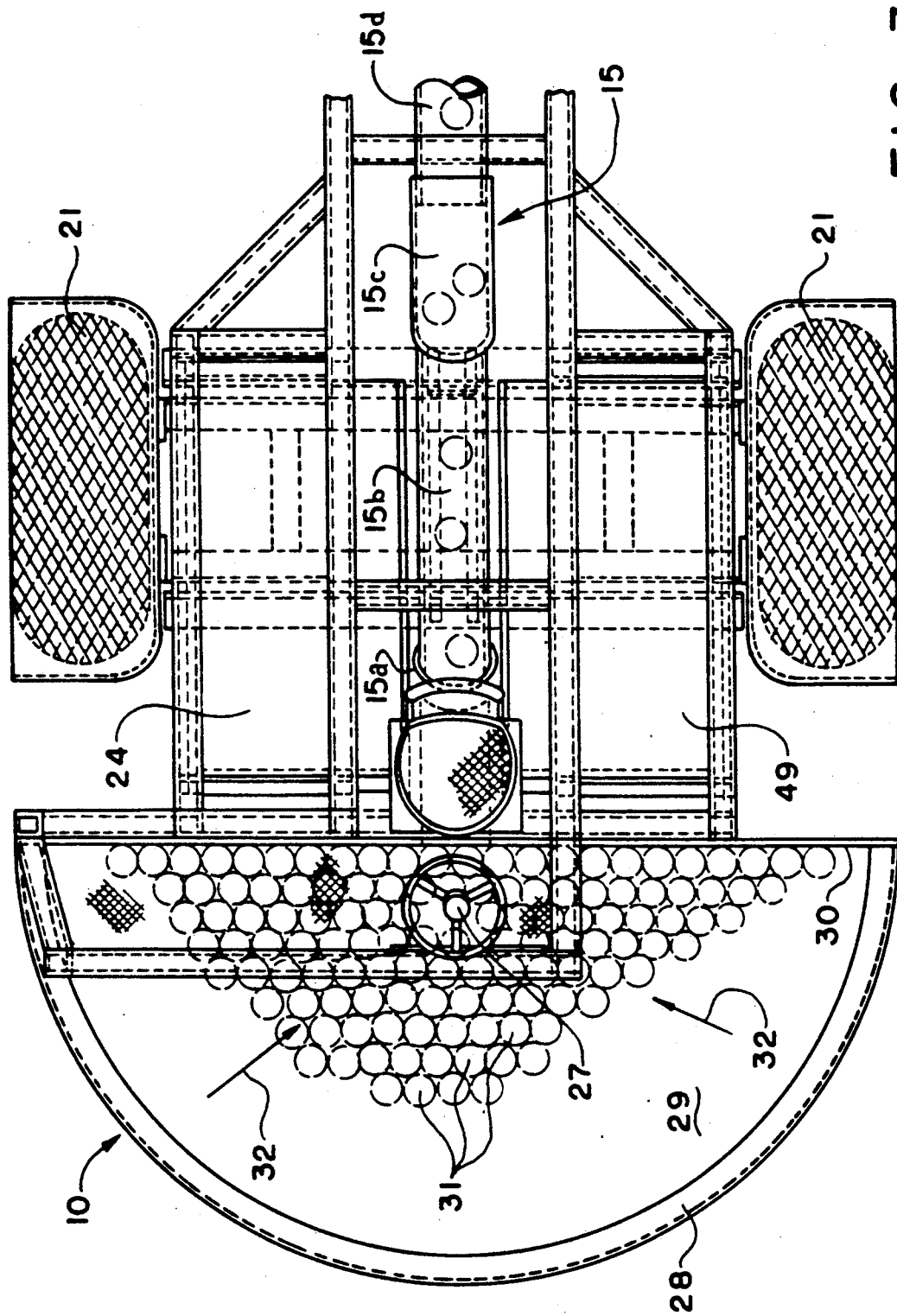
FIG. 3 is a partial plan view of the fruit harvesting apparatus taken generally along the plane 3—3 of FIG. 2 illustrating the semi-circular front tray and the driver console area.

Referring initially to FIG. 2, the vehicle 9 includes a front chassis assembly 17 and a rear chassis assembly 18. The front and rear chassies are hinged together as indicated at 19 to form a pivotal articulation axis therebetween generally along the axial centerline of the vehicle to assist in steering. A pair of front wheels 21 are rotatably mounted on front chassis 17, and a pair of rear wheels 22 are rotatably mounted on rear chassis 18. As is well known in the vehicle art; the front wheels 21 can be driven, the rear wheels 22 can be driven or all four wheels can be driven depending upon the desired application. A diesel engine 23 is mounted on and contained within the front chassis assembly 17 to drive the hydraulic pumps which activates the hydrostatic device to turn the wheels either forwardly or rearwardly. A fuel tank 24, as shown in FIG. 3, is mounted on the front chassis assembly 17 for supplying diesel fuel to the diesel engine 23.

The driving console section, indicated generally at 26, is positioned at the front of vehicle 9 in a relatively elevated position to provide good sight lines for the operator 13G. The driving console section 26 includes a steering wheel 27 for steering the vehicle 9 and contains additional conventional controls (not shown) for controlling the direction and speed of the vehicle 9 during the harvesting process in which citrus fruit is deposited in the tray 10. In addition, the driving console section includes actuators for controlling the dumping action of the hopper 16.

The tray 10 preferably has a semi-circular configuration in plan view and may extend substantially the entire width of the vehicle 9. A vehicle and tray width of approximately eight feet may be advantageous for younger trees planted in more dense configurations.

The tray 10 includes a semi-circular front wall 28, an open top, a downwardly sloping and curved bottom wall, indicated generally at 29, and a back wall 30. The bottom wall 29 slopes downwardly from the front wall 28 to the back wall 30 adjacent the front part of the vehicle 9. The downward slope of bottom wall 29 is preferably at an angle of up to about 20° relative to the horizontal. The bottom wall i also curved in a frusto conical sense to direct fruit radially inwardly toward the center of the back wall. This sloped and curved bottom wall gravity feeds the picked citrus fruit 31, which has been placed in tray 10 through the open top thereof, rearwardly, downwardly and radially inwardly relative to the vehicle 9, as generally indicated by the arrow 32 in FIGS. 2 and 3.

The downwardly sloped bottom wall 29 of tray 10 may be formed into discrete sections 34 and 35, if desired. The first section 34 may have a steeper downward slope than second bottom section 35. By utilizing two bottom wall sections, the citrus fruit is gradually and gently conveyed rearwardly, downwardly and radially inwardly to the inlet of duct transfer system 15 without damaging the fruit 31.

The tray 10 has a tubular flanged outlet opening 37 positioned at the bottom of back wall 30 of tray 10 at the center thereof. The tubular flange opening 37 is connected to the forward end of duct transfer system 15. The duct transfer system includes a plurality of interconnected hollow duct sections.

The forward or first section 15A is a flexible elbow duct sealingly connected at its forward end to the tubular outlet opening 37 in tray 10. The second rigid and straight duct section 15B of transfer system 15 is sloped upwardly from front to back and extends between and communicates with first flexible elbow duct section 15A and third flexible elbow duct section 15C. Fourth rigid duct section 15D is generally straight and extends horizontally between and communicates with third flexible elbow duct section 15C and fifth flexible elbow duct section 15E. Sixth rigid and straight duct section 15F is sloped upwardly from front to rear and extends between and communicates with fifth flexible elbow duct section 15E and seventh elbow duct section 15G. The rear end of flexible elbow duct section 15G is sealingly connected to tubular orifice 38 at the upper inlet end of hopper 16.

As best seen in FIGS. 1 and 3, the duct transfer system 15 including duct sections 15A through 15G extend substantially along the axial centerline of the vehicle 9. The flexible elbow duct sections 15A, 15C, 15E and 15G permit the transfer system ducts to be elevated from the bottom of the tray 10 to the top of the hopper 16 in smooth accurate gradations having relatively large radii to permit the smooth flow of citrus fruit therethrough.

The tubular orifice 38 may be 14 to 15 feet above ground level. The fruit being pneumatically conveyed through the transfer duct system is thus elevated approximately 12 to 13 feet along the length of the duct system, which can run approximately 30 to 35 feet. The axial orientation of the duct transfer system with gradual curves being provided by the flexible elbow duct sections for elevation purposes permits a relatively large diameter duct to be used, for example eight inches, to reduce clogging and fruit bruising or damage. To move fruit through the duct transfer system 15 from the tray 10 to the hopper 16, a pneumatic conveyance system is provided.

For this purpose, the hopper is provided with an outlet elbow 40 adjacent the tubular inlet opening 38. Elbow 40 communicates between the cavity 41 of hopper 16 and a vacuum tube 42 extending along one sidewall of the hopper 16. The bottom end of vacuum tube 42 has a flange 43 thereon which is normally sealed to a confronting flange 44 at the top of vertical vacuum tube 46. Vacuum tube 46 extends downwardly into blower 47, which is run by a hydraulic motor 48 mounted on the rear chassis 18 of frame 9. The hydraulic fluid tank 49 is positioned parallel to and opposite from diesel gas tank 24, with the duct transfer system 15 passing therebetween. The hydraulic fluid tank 49 contains a reservoir of hydraulic fluid allowing the hydraulic motor 48 to be selectively run on a continuous basis to in turn continuously run the blower 47.

A variable speed blower 47 draws air downwardly through vacuum tubes 42 and 46 to create a vacuum or subatmospheric condition within the cavity 41 of hopper 16. The blower operation and vacuum condition created thereby also draws air through the duct transfer system 15 from the tray 10 to the hopper 16, as indicated by arrows 50. This air movement pneumatically conveys the citrus fruit 31 delivered to the entrance of duct section 15A through the entire duct system and thence into the hopper. This pneumatic conveyance system delivers picked citrus fruit from the tray 10 through the duct transfer system to the hopper faster than pickers can deposit the fruit into the tray 10. Thus, the fruit harvesting apparatus 1 of the present system can be substantially continuously used along the aisles of the grove until the hopper 16 is substantially full of fruit. The pneumatically conveyed fruit passes through the tubular inlet opening 38 and enters the hopper, with the entrance orifice to elbow 40 of the vacuum tube system being covered by a screen or the like to preclude citrus fruit from being sucked therethrough.

When substantially filled, the hopper 16 can be pivoted from its normal reception position illustrated in FIG. 2 to its pivotally elevated dumping position. To this end, the hopper 16 is pivotally connected to the upper back end of rear chassis 18, as indicated at 52.

Two transversely spaced piston cylinder assemblies 53 extend between a back support frame 54 on rear chassis 18 and the sidewall of the hopper 16. Selective extension of the piston rods of piston cylinder assemblies 53 is operative to pivot the hopper 16 about pivotal connection 52.

To provide clearance for this pivotal movement, the forward end of sixth duct section 15F and the rearward end of fifth flexible duct section 15E are disconnected from one another. Similarly, flanges 43 and 44 are disconnected from one another to uncouple vacuum duct 42 from vacuum duct 46. With these disconnections made, the hopper 16 is free to accurately move around pivot connection 52 when the piston rod of piston cylinder assemblies 53 are extended.

When the piston rods are fully extended, the hopper has been pivotally moved to its dumping position. An outlet door 55 is positioned in top wall 56 of the hopper 16. With the hopper in its dumping position, the hopper wall 56 and fruit outlet door 55 are generally below the cavity 41 of the hopper and directly above the bed of a trailer positioned to receive the fruit. A piston cylinder assembly 57 is operative to open the door 55 to allow the fruit to be gravity fed from the hopper 16 to the bed of the trailer. In the dumping position, the hopper is inclined upwardly from back to front at a gentle slope or angle to allow the fruit to gradually be gravity fed from the cavity of the hopper to the bed of the trailer.

On occasion, the fruit harvesting vehicle of the present invention will be used with a fruit transporting vehicle having a higher fruit receiving bed and/or higher trailer sidewalls. To provide compatibility between the fruit harvesting vehicle and fruit trailers of all sizes, the hopper of the present invention in an alternative embodiment can be selectively vertically elevated prior to dumping, if necessary.

Figure 9:
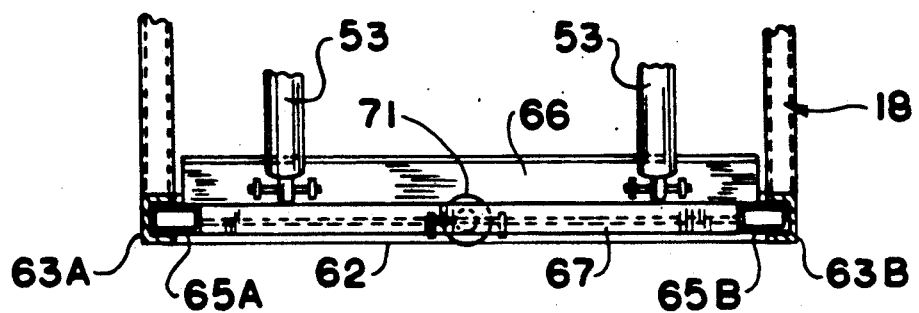
FIG. 9 is a horizontal cross section taken on the plane 9—9 of FIG. 8 showing the guidance of the movable frame relative to the fixed frame.

As viewed in FIGS. 7 through 10, the rear chassis assembly 18 includes a fixed rear frame, indicated generally at 60, and a vertically movable rear frame, indicated generally at 61. The fixed rear frame 60 includes a base, fixed channel 62 extending horizontally across the width of the rear chassis 18. The fixed frame further includes two parallel side channels 63A and 63B fixed to and extending upwardly from base channel 62. As best shown in FIG. 9, the side channels 63 face inwardly toward one another to provide guidance for the selective vertical movement of the movable back frame 61.

The movable back frame 61 includes two generally vertically extending parallel tubular side posts 65A and 65B. These tubular side posts are interconnected and rigidified by generally horizontal cross members comprising lower cross angle 66, middle I beam 67 and upper cross beam 68. Lower, middle and upper cross members 66 through 68 extend between and are connected to side posts 65A and 65B to form a rigid movable back frame assembly 61.

As best illustrated in FIG. 9, the tubular side posts 65A and 65B are respectively slidingly received in channels 63A and 63B of the fixed rear frame 60 to permit relative movement therebetween. This vertical movement of the movable rear frame 61 relative to the fixed frame 60 is selectively provided by a piston cylinder assembly 71 extending between base channel 62 of the fixed frame and the middle I beam 67 of the movable frame 61. Extension of the piston rod of piston cylinder assembly 71 will elevate the movable frame 61 relative to the fixed frame 60, with such vertical movement being guided by channels 63A and 63B on the fixed frame. Similarly, selective retraction of the piston rod of piston cylinder assembly 71 will lower the movable frame 61. The selective vertical movement of the vertically movable back frame 61 will result in concurrent vertical movement of the hopper 16.

For this purpose, the transversely spaced piston cylinder assemblies 53 have their distal end pivotally connected to lower angle 66 of the rear movable frame. The piston rods of the piston cylinder assemblies 53 are pivotally connected at their respective proximal ends to the lower wall portion of hopper 16. The piston cylinder assemblies 53 thus extend between and are pivotally connected at their opposite ends to the rear movable frame 61 and the hopper 16. Similarly, the transversely spaced pivotal connections 52 of the hopper 16 to the movable frame 61 are positioned on the upper tubular beam 68 of that movable frame 61. Therefore, when the movable frame 61 is elevated, the connections between the movable frame and the hopper (as provided by the piston cylinder assemblies 53 and the hinge connections 52) results in the hopper 16 concurrently vertically moving with the movable frame assembly 61.

Figure 10:
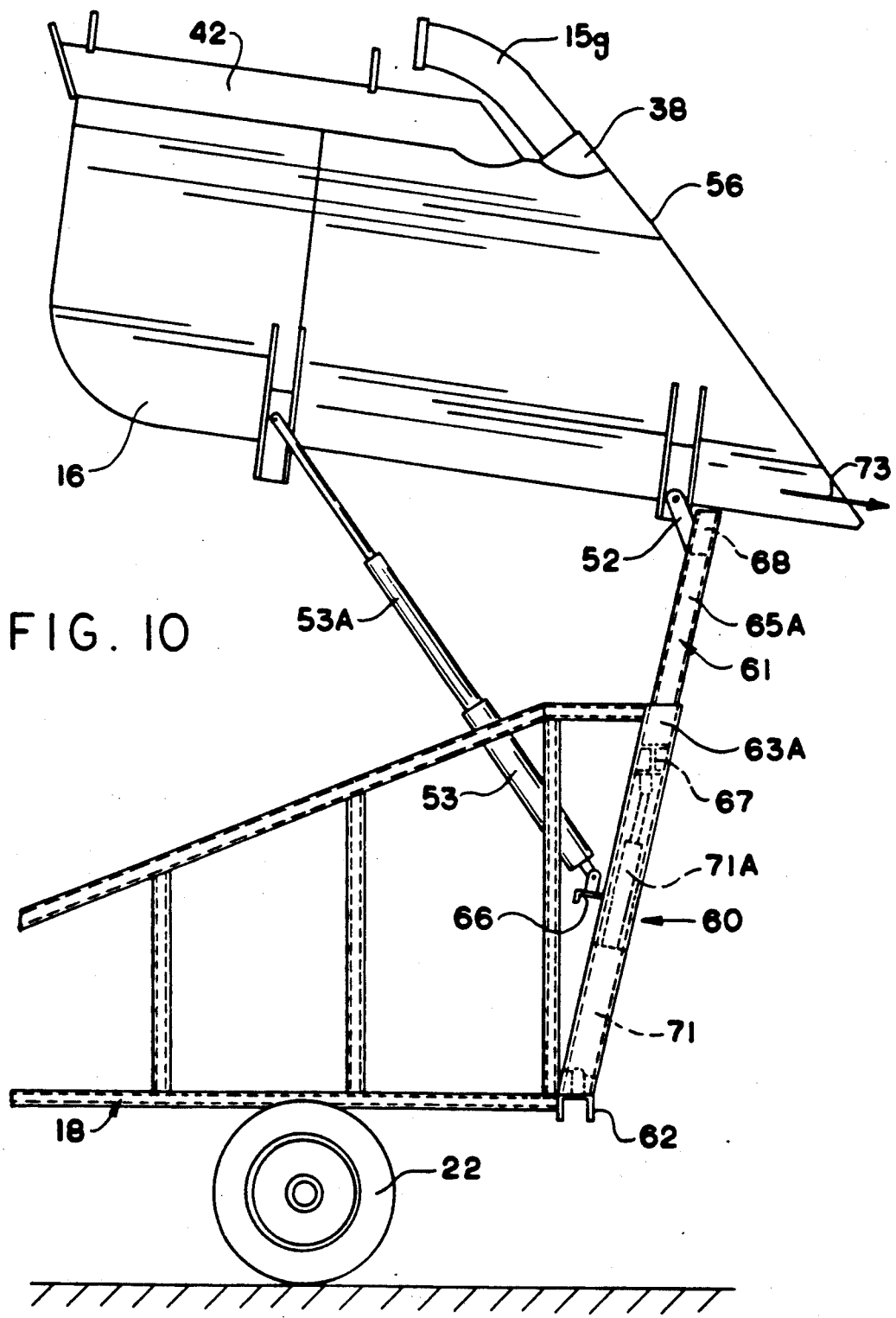
FIG. 10 is a partial side elevation similar to FIG. 7 but showing the hopper in an elevated and pivoted position to dump the fruit into a fruit transfer vehicle.

The operation of the mechanism for selectively vertically elevating hopper 16 is believed apparent from the above description but is described hereinafter in the context of FIG. 10 for purposes of completeness. When the trailer body of the fruit conveyance vehicle has an elevated bed and/or elevated sidewalls, the piston cylinder assembly 71 is activated to vertically extend the piston rod 71A thereof to concurrently raise the entire rear movable frame 61 and hopper 16. When thus elevated to provide an additional vertical clearance of up to 10 feet (as required), the piston cylinder assemblies 53 are actuated. Vertical extension of the piston rods 53A of piston cylinders 53 pivots the hopper 16 about hinge connections 52 to the position illustrated in FIG. 10. In such position, the hopper is inclined slightly relative to the horizontal from front to back. The outlet door 55 is opened to allow the contained fruit to dump into the transport trailer in the direction indicated generally by arrow 73 in FIG. 10. When the dumping is complete, the piston rods 53A of piston cylinder assemblies 53 are retracted to pivot the hopper 16 about hinges 52 to return the hopper to its normal "picking" position. Piston rod 71A of piston cylinder assembly 71 is then retracted to lower the movable frame 61 to in turn lower the hopper into its position within the side framework on the rear chassis 18. The hopper 16 is then in position to have ducts 15 E and F and flanges 43 and 44 reconnected in preparation for the next picking cycle.

Figure 4:
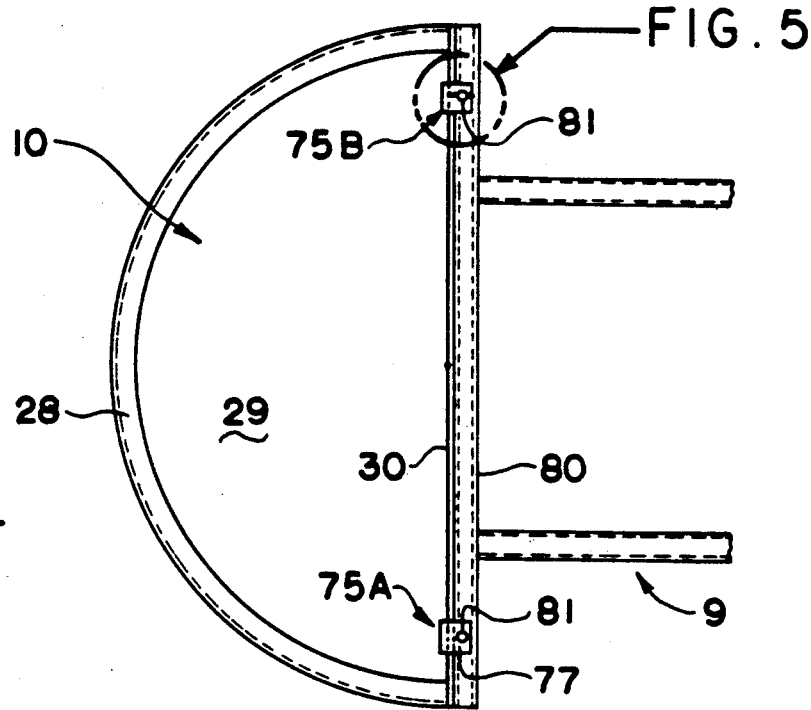
FIG. 4 is a plan view of a tray removably secured to the chassis frame of a fruit harvesting vehicle.
Figure 5:
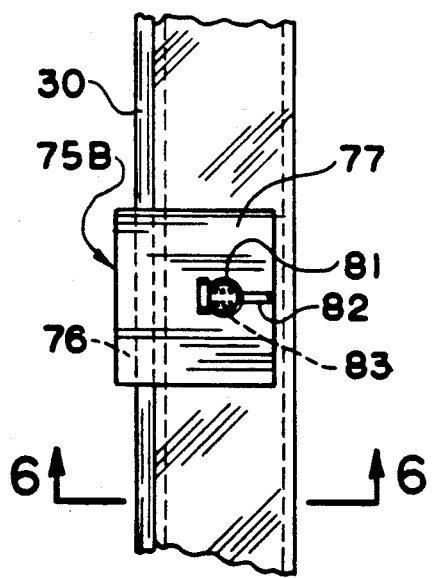
FIG. 5 is an enlarged plan view of one of the selectively removable tray mounts, with this enlarged mount being identified as to its position relative to the vehicle by the circled portion of FIG. 4.
Figure 6:
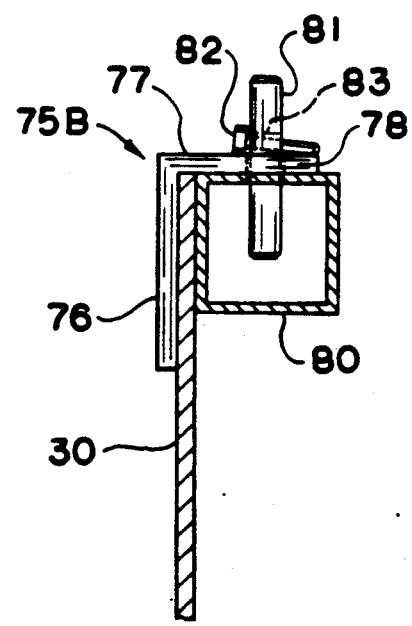
FIG. 6 is a vertical cross section taken generally along the plane 6—6 of FIG. 5 showing the L-shape mounting bracket for the tray.
Figure 7:
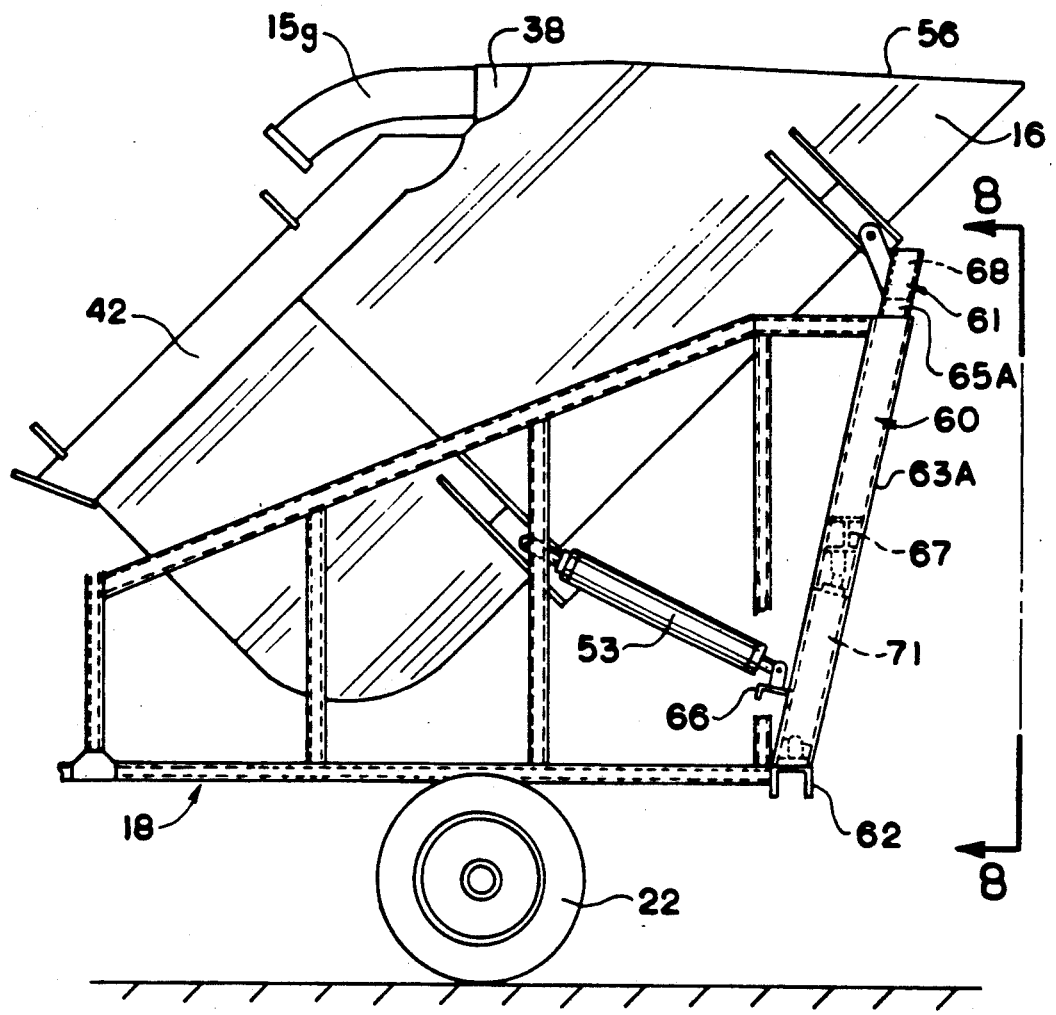
FIG. 7 is a partial side elevation similar to the back end of FIG. 3 illustrating alternative frame structure for selectively elevating the hopper relative to the vehicle.
Figure 8:
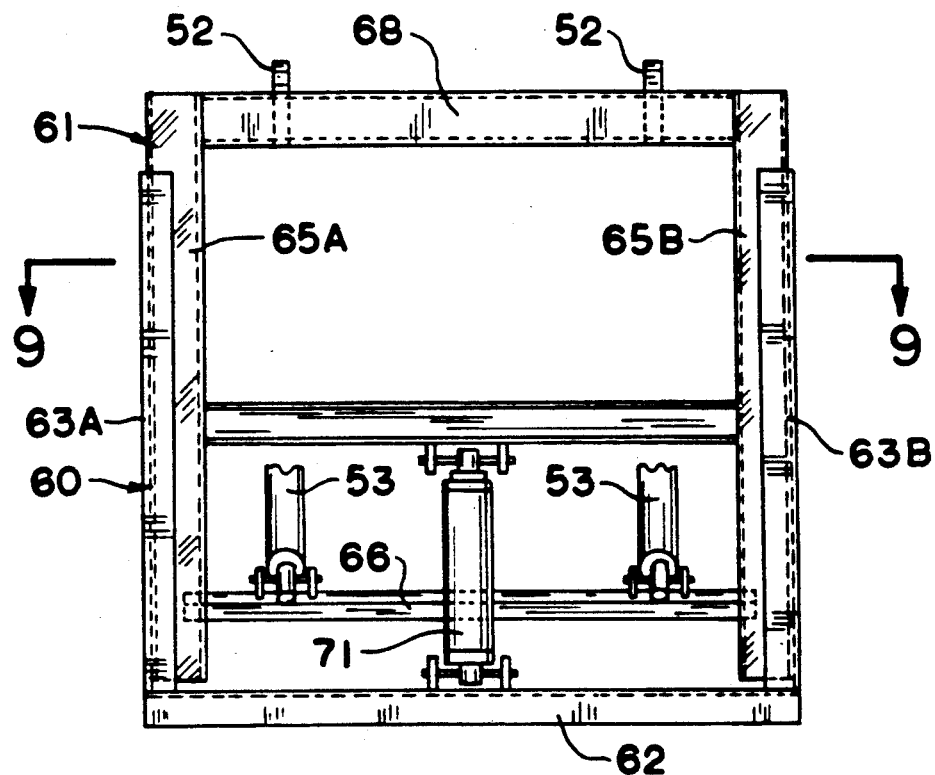
FIG. 8 is a rear elevation taken along the plane 8—8 of FIG. 7 showing the details of the fixed and movable frames selectively allowing the hopper to be raised or lowered.

It will be apparent from the foregoing that changes may be made in the details of construction and configuration without departing from the spirit of the invention as defined in the following claims. For example, the tray 10 on the front of vehicle 9 can be adapted to allow the tray to be selectively removably mounted on that vehicle, as illustrated in FIGS. 4 through 6.

For this purpose, the back wall 30 of the tray 10 may have two transversely spaced L-shape mounting brackets, indicated generally at 75A and 75B, mounted thereto. Each of these mounting brackets is identical and mounting bracket 75B is illustrated for purposes of explanation in FIGS. 5 and 6.

L-shaped mounting bracket 75B includes a vertical leg 76 and a horizontal leg 77. Vertical leg 76 of the mounting bracket is fixedly secured to the front surface of back wall 30 of tray 10. The horizontal leg 77 of L-shape mounting bracket 75B extends over and beyond the top of tray back wall 70. The horizontal leg 77 has a hole 78 positioned therein selectively to cooperate with a fixed post on the frame of the front chassis 17 of vehicle 9.

Such chassis frame includes a tubular cross brace 80 extending transversely of the vehicle near or at the front thereof. The tubular cross brace 80 has a vertically extending post 81 rigidly secured to its top wall. The tray 10 is lowered into position with the post 81 being received in the hole 78 in horizontal leg 77 on L-shape mounting bracket 75. A retention pin 82 is then inserted through a bore 83 in the upstanding portion of post 81 to retain the mounting bracket 75B in position. In such position, the horizontal leg 77 rests against and is supported by the top wall of cross beam 80 on the vehicle frame to thereby mount the tray to the vehicle.

When necessary, the tray 10 can be removed from the vehicle 9. For this purpose, the retention pins 82 are withdrawn from vertically upstanding posts 81. The tray 10 is then sufficiently elevated for the horizontal upper legs 77 of the respective mounting brackets to clear the posts 81 on the vehicle 9 to allow the tray to be removed. An alternate tray may then be mounted on the vehicle 9.

This alternate tray may have a different configuration from the tray removed. However, this alternate tray has mounting brackets 75A and 75B of identical spacing. The alternate tray is lowered into position with the holes on the horizontal legs 77 of the brackets respectively receiving the vertical posts 81 on the vehicle frame. The retention pins 82 are then placed through bores 83 in posts 81 to complete the mount.

The size of the alternate tray can be selected for the specific grove planting configuration being picked in order to maximize the efficiency of the harvesting system and method. For example, in groves having aisles only slightly wider than the width of the vehicle, the width of the tray could be reduced. This width reduction would allow some clearance to the side and front of the tray to provide room for the people harvesting the trees.

In addition, the shape of the tray can be varied depending upon the capacity desired therefor. The position of the tray or trays relative to the vehicle can also be varied including, for example, alternate or additional trays mounted to the sides or back of the vehicle. The present tray system could also be added to a boom type picking and pruning machine to enhance its effectiveness for picking fruit from young trees or from the lower portions of more mature tall trees.

We claim:

1. A fruit harvesting apparatus comprising a vehicle, means to move that vehicle along the ground, a tray which is mounted to the vehicle adjacent the ground to receive picked fruit, said tray including a sloped bottom wall which conveys the received fruit to a first end of a transfer system, a conveyor which conveys the fruit from said first end of said transfer system to a second end of said transfer system, said second end of said transfer system depositing the fruit to said hopper carried by said vehicle;

wherein the hopper is pivotally connected to the vehicle adjacent the back end thereof and may be selectively moved about that pivotal connection to remove the fruit temporarily stored therein; and wherein the vehicle has a rear vertically movable frame assembly, the hopper being carried by the rear vertically movable frame assembly to allow the hopper to be selectively elevated for universal compatibility with fruit transfer trailers of various sizes.

2. The fruit harvesting apparatus as set forth in claim 1 wherein said conveyor comprises a pneumatic duct system.

3. A fruit harvesting apparatus comprising a vehicle having a front end and a back end, means to move the vehicle along the ground, a tray, mounted to the vehicle adjacent the ground, for receiving picked fruit, a pivotable hopper, mounted to the back end of said vehicle, for temporarily storing the picked fruit; and a transfer system for transferring the picked fruit from said tray to said hopper;

wherein said tray includes a bottom wall and a set of side walls extending from said bottom wall;

wherein said tray further includes a channel formed at least partially by channel-forming sections of said bottom wall;

wherein said transfer system connects with the channel of said tray in such a manner that a smooth transition surface is formed between said tray and said transfer system; and wherein said transfer system extends from a tray outlet to said hopper.

4. A fruit harvesting apparatus as set forth in claim 3 wherein said bottom wall slopes toward one of said side walls.

5. A fruit harvesting apparatus as set forth in claim 4 wherein said bottom wall connects with one of said side walls to form said channel to guide the fruit to said tray outlet.

6. A fruit harvesting apparatus as set forth in claim 3 wherein one of said side walls comprises a back wall positioned adjacent said vehicle and wherein said bottom wall slopes toward said back wall.

7. A fruit harvesting apparatus as set forth in claim 6 wherein said bottom wall connects with said back wall to form said channel to guide the fruit to the tray outlet.

8. A fruit harvesting apparatus as set forth in claim 3 wherein said bottom wall connects with one of said side walls to form said channel to guide the fruit to said tray outlet.

9. A fruit harvesting apparatus as set forth in claim 3 wherein said bottom wall connects with said back wall to form said channel to guide the fruit to said tray outlet.

* * * * *